United States Patent

Kobayashi et al.

[11] Patent Number: 5,754,254
[45] Date of Patent: May 19, 1998

[54] DIGITAL VIDEO AUDIO PROCESSING APPARATUS

[75] Inventors: Seiji Kobayashi; Tsutomu Takamori; Ryuji Nonaka, all of Kanagawa, Japan

[73] Assignee: Sony Corporation, Tokyo, Japan

[21] Appl. No.: 583,549

[22] Filed: Jan. 5, 1996

[30] Foreign Application Priority Data

Jan. 10, 1995 [JP] Japan ................. 7-018569

[51] Int. Cl.$^6$ ................................... H04N 9/74
[52] U.S. Cl. ................ 348/578; 348/571; 348/705; 386/54; 386/96
[58] Field of Search .................. 348/578, 705, 348/706, 222, 738, 541, 553, 552, 555; 386/96, 54

[56] References Cited

U.S. PATENT DOCUMENTS 5,231,512  7/1993  Ebihara .................... 348/705
5,305,105  4/1994  Heo ........................ 348/485
5,343,193  8/1994  Shoda ................... 340/825.79

*Primary Examiner*—Victor R. Kostak
*Attorney, Agent, or Firm*—Frommer Lawrence & Haug LLP; William S. Frommer

[57] ABSTRACT

A digital video audio processing apparatus in which serial signal formed digital video signals and digital audio signals, which are supplied to a plurality of input terminals and are multiplexed each other, are converted into parallel signal form respectively; the digital video signals and digital audio signals are separated respectively; switching processing or video special effect processing is performed on a plurality of digital video signals; switching processing or mixing processing is performed on a plurality of digital audio signals; and these processed digital video signals and digital audio signals are multiplexed each other to convert into serial signal form and output them.

4 Claims, 4 Drawing Sheets

DIGITAL VIDEO AUDIO PROCESSING APPARATUS

BACKGROUND OF THE INVENTION

1. Field of the Invention

This invention relates to a digital video audio processing apparatus, and more particularly is applicable to a digital switcher which shifts multiple digital video signals and multiple digital audio signals to become the source of broadcasting program and which outputs upon applying special effects.

2. Description of the Related Art

Heretofore, in this type of digital switcher, digital video signal and digital audio signal have been inputted and outputted severely. For example, as shown in FIG. 1, a digital video audio processing apparatus 1 inputs video signal S1 and audio signal S2 reproduced by a digital video tape recorder (hereinafter referred to as digital VTR) 2 to a digital switcher 3 respectively. Moreover, the digital video audio processing apparatus 1 inputs video signal S3 and audio signal S4 reproduced by a digital VTR 4 to the digital switcher 3.

The digital switcher 3 supplies video signals S and S3 to a video signal processing circuit 6 via a video signal input circuit 5 as video signals S5 and S6. Also, the digital switcher 3 supplies audio signals S2 and S4 to an audio signal processing circuit 8 as audio signals S7 and S8 via an audio signal input circuit 7.

The video signal processing circuit 6 supplies video signal S9 obtained by processing video signals S1 and S3 to a digital VTR 10 as video signal S10 via a video signal output circuit 9. The audio signal processing circuit 8 supplies audio signal S11 obtained by processing audio signals S2 and S4 to the digital VTR 10 as audio signal S12 via an audio signal output circuit 11.

Similarly, as regards to other digital VTRs (not shown in figure), the other video signal S13 outputted by the video signal processing circuit 6 is supplied as video signal S14 via the video signal output circuit 9 as well as the other audio signal S15 outputted by the audio signal processing circuit 8 is supplied as audio signal S16 via the audio signal output circuit 11.

However, in general the digital switcher for broadcasting is connected to a large number of material input/output devices such as digital VTRs. More specifically, in the case where there are N systems and M systems in the input and output respectively and each system handles 16 channels of audio signals respectively, the number of cables required for the input and the output will be N numbers and N×8 numbers for video and audio respectively on the input side, and M numbers and M×8 numbers for video and audio respectively on the output side.

As described above, the number of cables to be used for audio signal is much larger than the number of cables to be used for video signal. Moreover, shapes of connecting connectors for audio signal cables are bigger than that for video signal and occupy larger area on the connection panel. Accordingly, if the number of connectors to be connected to digital VTRs increases, cables occupy very large area on the connection panel and this causes a problem that the main unit of digital switcher becomes large sized as a whole.

Furthermore, as shown in FIG. 2, a broadcasting digital video audio transmission system 12 is equipped with at least one set of backup video transmitting digital switcher 13 and audio transmitting digital switcher 14 respectively in addition to the main digital switcher 3. These backup digital switchers 13 and 14 are connected to input output cables for video and input output cables for audio from digital VTRs 2 and 4 respectively. Thus, this has created a problem that the setting area has become larger as a whole when the number of connecting digital VTRs increased.

In this connection, video signal S10 outputted by the digital switcher 3 and video transmitting digital switcher 13 respectively will be shifted by a switch 15 of 2 to 1 and broadcasted. Furthermore, audio signal S12 outputted by the digital switcher 3 and the audio transmitting digital switcher 14 respectively will be shifted by a switch 16 of 2 to 1 and broadcasted.

In the device for outputting video signal by serial digital signal such as digital VTRs having D1 and D2 format or the similar format, there are devices capable of outputting serial digital video signal in which digital audio signal is fed over the video signal synchronizing section.

However, the conventional digital switcher cannot directly input serial digital video signal in which audio signal is mixed, and the external device to separate audio signal and video signal is required.

SUMMARY OF THE INVENTION

In view of the foregoing, an object of this invention is to provide a digital video audio processing apparatus capable of decreasing the number of cables to be connected with the external devices.

The foregoing object and other objects of the invention have been achieved by the provision of a digital video audio processing apparatus comprising: a plurality of input terminals to which digital video signal and digital audio signal multiplexed each other are inputted with serial signal form; first conversion means for converting the digital video signal and digital audio signal with serial signal form, which are supplied to a plurality of input terminals and multiplexed each other, into parallel signal form respectively; demultiplexing means for respectively separating plural digital video signals and digital audio signals which are converted into parallel signal form at the conversion means and multiplexed each other; video signal processing means, to which plural digital video signals respectively separated at the demultiplexing means are supplied, for performing the switching processing or video special effect processing on the supplied plural digital video signals; audio signal processing means, to which plural digital audio signals respectively separated at the demultiplexing means are supplied, for performing the switching processing or mixing processing on the supplied plural digital audio signals; multiplexing means, to which the processed digital video signal and digital audio signal output from the video signal processing means and audio signal processing means are supplied, for multiplexing the supplied digital video signal and digital audio signal each other; and second conversion means for converting the digital video signal and digital audio signal which are multiplexed each other at the multiplexing means into the serial signal form.

The nature, principle and utility of the invention will become more apparent from the following detailed description when read in conjunction with the accompanying drawings in which like parts are designated by like reference numerals or character.

DETAILED DESCRIPTION OF THE EMBODIMENT

Figure 1:
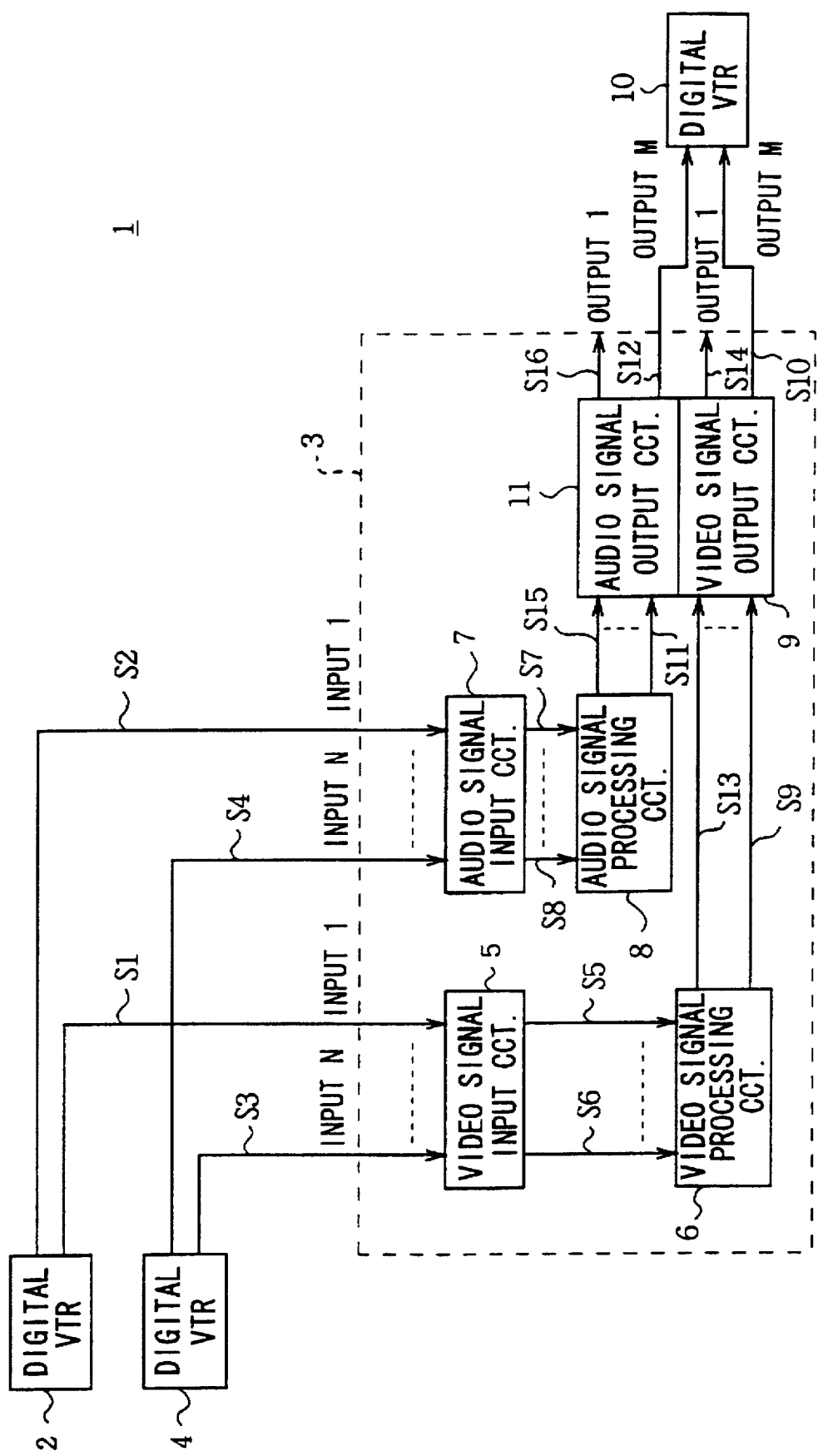
FIG. 1 is a block diagram showing an example of conventional digital video audio processing apparatus.
Figure 2:
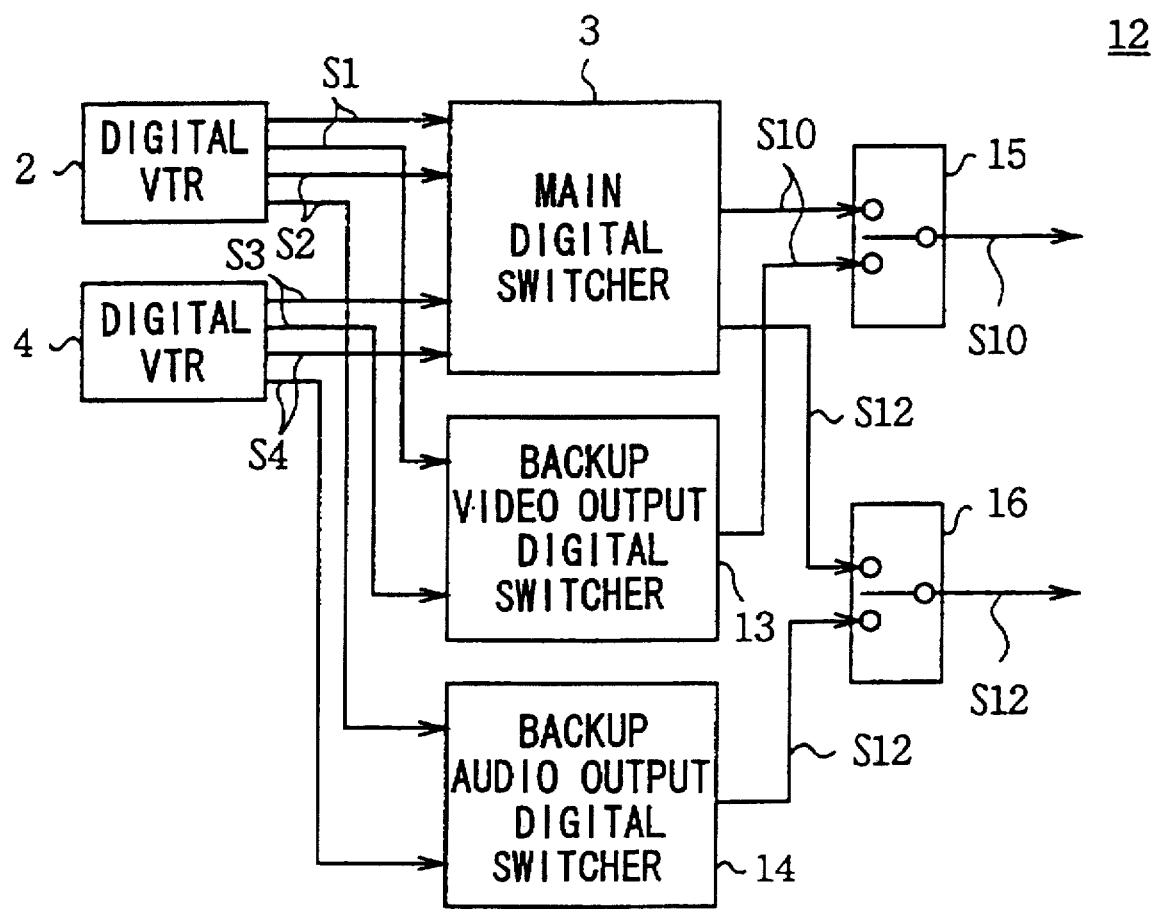
FIG. 2 is a block diagram showing an example of conventional digital video audio transmission system equipped with the backup system.
Figure 3:
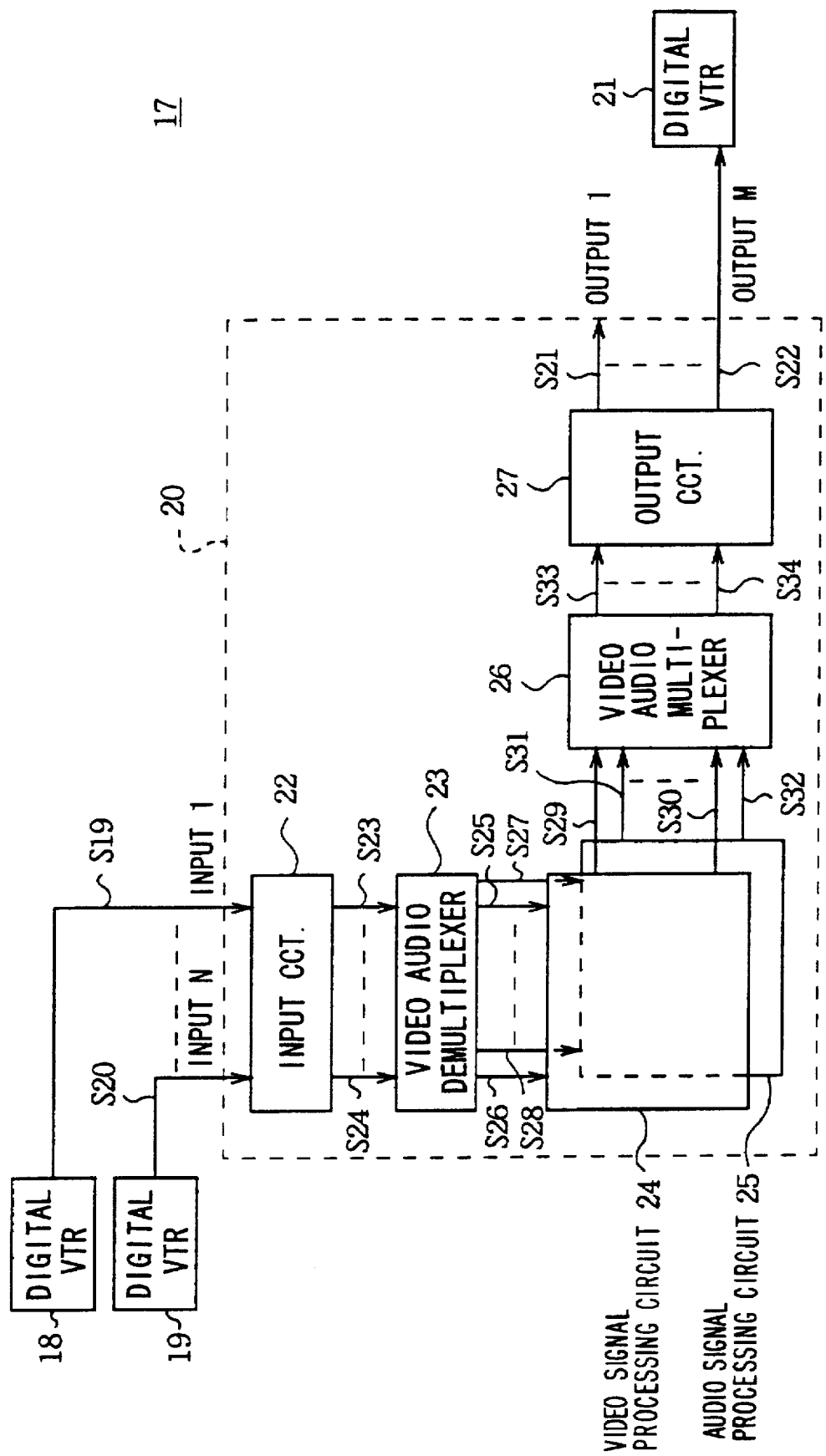
FIG. 3 is a block diagram showing an embodiment of a digital video audio processing apparatus according to the present invention.

Preferred embodiments of this invention will be described with reference to the accompanying drawings:

In FIG. 3, 17 generally shows a broadcasting digital video audio processing apparatus in which video material output devices such as digital VTRs 18 and 19 are connected to a digital switcher 20 up to the maximum N systems. The digital VTRs 18 and 19 output serial digital video audio signals S19 and S20 in which digital audio signal is superimposed (multiplexed) to the synchronizing section of digital video signal according to SMPTE 259M and 272M standards. At this point, digital video audio signals S19 and S20 become signal to be supplied to the input terminal of the first system of the digital switcher 20 (indicated as input 1 in figure) and become signal to be supplied to the input terminal of the Nth system of the digital switcher 20 (indicated as input N in figure) respectively. The digital video signal is transmitted with serial signal form, which is disclosed in U.S. Pat. No. 5,231,512.

The digital switcher 20 generates digital video audio signal of M systems processed depending on digital video audio signal of N systems, and outputs this to the video material input device such as digital VTR 21. Here, the digital switcher 20 outputs digital video audio signal S21 as an output of the first system (shown as output 1 in figure) and digital video audio signal S22 as output of the Mth system (shown as output M in figure) to the digital VTR 21.

Digital video audio signals S19 to S22 of N system and M system are transmitted by means of one coaxial cable respectively and then connected to only one of N numbers of input terminals (not shown in figure) and M numbers of output terminals (not shown in figure) arranged in a main box of the digital switcher 20 respectively. Thus, the digital switcher 20 is connected to maximum N numbers of coaxial cables on the input side and M numbers of coaxial cables on the output side.

The digital switcher 20 inputs digital video audio signals S19 for the first system to the Nth system into an input circuit 22 and detects errors and equalizes these. Furthermore, the input circuit 22 converts these from serial to parallel and outputs to the video audio demultiplexer 23 as digital video audio signal S23 of the first system to digital video audio signal S24 of the Nth system respectively.

The video audio demultiplexer 23 separates digital video signals S23 to S24, digital video signal from the first system to the Nth system S25 to S26 and the digital audio signal from the first system to the Nth system S27 to S28 respectively. Moreover, the video audio demultiplexer 23 outputs digital video signals S25 to S26 to a video signal processing circuit 24 and simultaneously outputs digital audio signals S27 to S28 to an audio signal processing circuit 25.

The video signal processing circuit 24 and the audio signal processing circuit 25 process digital video signals S25 to S26 and digital audio signals S27 to S28 by switching, mixing and applying special effects respectively. Moreover, the video signal processing circuit 24 and the audio signal processing circuit 25 input digital video signals of the first system S29 to the Mth system S30 and the digital audio signals of the first system S31 to the Mth system S32 which are obtained as a result of separate processing, to a video audio multiplexer 26.

The video audio multiplexer 26 superimposes (multiplexes) digital audio signals S31 to S32 over the synchronizing signal section of digital video signals S29 to S30, and inputs parallel superimposed signals from the first system S33 to the Mth system S34 to an output circuit 27. The output circuit 27 converts superimposed signals S33 to S34 from parallel to serial, and outputs these as the digital video audio signals from the first system S21 to the digital video audio signal of Mth system S22 respectively.

In this connection, the digital audio signal is standardized as 32 bit signal of 32 kHz, 44.1 kHz or 48 kHz according to the AES/EBU standards. On the other hand, the digital video signal is standardized as 10 bit composite signal of 14.3 MHz and 17.7 MHz and 10 bit component signal of 27 MHz in the NTSC system and PAL system respectively. In the case of component signal sixteen channels of digital audio signals can be superimposed to this digital video signal, while four channels of digital audio signals can be superimposed in the case of composite signal.

Thus, audio signal of AES/EBU standards is time base compressed and audio signal 20 bit and flag 3 bit among 32 bit data is converted to 10 bit data of 3 samples, and superimposed to the video signal synchronizing section. In the case of separating the audio signal from the video signal, audio data is extracted from the synchronizing section and time base expanded and restored to the original audio signal of AES/EBU standards.

Figure 4:
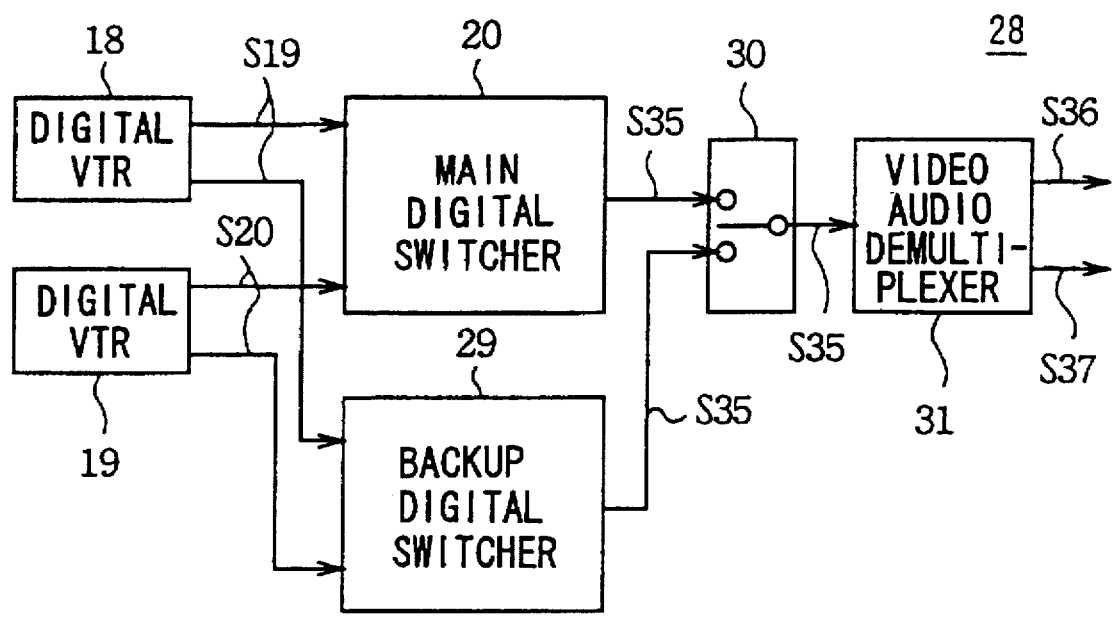
FIG. 4 is an embodiment of digital video audio transmission system, in which the digital video audio processing apparatus shown in FIG. 3 is used as a main digital switcher and a backup digital switcher.

According to the foregoing construction, digital master switchers for broadcasting are generally equipped with backup systems in order to avoid the image disorder due to switcher troubles in broadcasting. More specifically, as shown in FIG. 4, in a digital video audio transmission system 28, digital video audio signals S19 and S20 of digital VTRs 18 and 19 are inputted to the main digital switcher 20 and backup digital switchers 29 by means of only one coaxial cable respectively.

Digital video audio signal S35 outputted by the digital switchers 20 and 29 respectively is shifted by the switcher 30 of 2:1 and separated into video signal S36 and audio signal S37 by video audio demultiplexer 31 respectively and telecasted.

Accordingly, it is sufficient to connect only N numbers and M numbers of coaxial cables to the input side and output side of the main digital switcher 20 and backup digital switcher 29 respectively, and sixteen channels of audio signals can be mixed in one coaxial cable of video signal and transmitted.

With this arrangement, it becomes unnecessary to connect cables for audio signal only, the number of cables to be connected can be remarkably reduced as compared with the conventional device. As a result, the connection panel of digital switcher can be smaller size than before. And hence, the main box of digital switcher can be compact and an area for the device to occupy would be reduced, i.e., space efficiency can be improved.

According to the foregoing construction, digital video audio signals of N systems S19 to S20 in which sixteen channels of audio signals S27 to S28 are superimposed over video signals S25 to S26 are inputted from digital VTRs 18 and 19 through one input terminal per one system, and digital video audio signals of M systems S21 to S22 in which sixteen channels of audio signals S31 to S32 are superimposed over video signals S29 to S30 are outputted to such as digital VTR 21 through one output terminal per one system, and thereby the number of cables to be connected to digital VTRs 18, 19 and 21 can be remarkably decreased.

Further, the embodiment described above has dealt with the case of superimposing the digital audio signal to the digital video signal by the SMPTE 259M and 272M standards. However, the present invention is not only limited to the above, but also can be suitably applied to the case of superimposing the digital audio signal to the digital video signal by an arbitrary standard.

Furthermore, the embodiment described above has dealt with the case of applying the present invention to the digital switcher 20. However, the present invention is not only limited to the above, but also can be widely applied to the case of inputting serial digital video audio signal in which digital audio signal is superimposed to digital video signal through one terminal and respectively processing the video signal and audio signal separated on a basis of this serial digital video audio signal.

According to the present invention as described above, by inputting digital video audio signals of multiple systems in which video signal and audio signal are superimposed through one input terminal per one system from the outside, a digital video audio processing apparatus capable of reducing the number of cables to be connected to outside remarkably can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A digital video/audio processing apparatus comprising:
   a plurality of input terminals to which each input terminal receives a digital video signal and a digital audio signal multiplexed in serial signal form;
   first conversion means for converting each said digital video signal and digital audio signal multiplexed in serial signal form to a plurality of said input terminals into parallel signal form respectively;
   demultiplexing means for respectively separating digital video signals from digital audio signals converted into parallel signal form by said conversion means;
   video signal processing means, to which plural digital video signals respectively separated by said demultiplexing means are supplied, for performing switching processing or video special effect processing on the supplied plural digital video signals;
   audio signal processing means, to which plural digital audio signals respectively separated by said demultiplexing means are supplied, for performing switching processing or mixing processing on the supplied plural digital audio signals;
   multiplexing means, to which the processed digital video signal and digital audio signal output from said video signal processing means and said audio signal processing means are supplied, for multiplexing the video-processed digital video signal with the audio-processed digital audio signal; and
   second conversion means for converting said digital video signal and digital audio signal multiplexed by said multiplexing means into serial signal form.

2. The digital video/audio processing apparatus according to claim 1, wherein
   said serial signal formed digital video signal and digital audio signal which are multiplexed each other are supplied from the digital video/audio signal processing apparatus.

3. A digital video/audio processing apparatus for processing a plurality of serial signals, each serial signal reproduced from a digital VTR as a digital video signal multiplexed with an audio digital signal, said apparatus comprising:

a plurality of input terminals, each input terminal receiving a respective serial signal;

serial-to-parallel conversion means coupled to said input terminals for converting each serial signal received at each input terminal into a parallel signal;

demultiplexing means coupled to said serial-to-parallel conversion means for demultiplexing each parallel signal generated by said serial-to-parallel conversion means;

digital video signal processing means coupled to said demultiplexing means for performing special digital processing on digital video signals demultiplexed by said demultiplexing means;

digital audio signal processing means, separate from said digital video signal processing means, coupled to said demultiplexing means for performing special digital processing on digital audio signals demultiplexed by said demultiplexing means;

multiplexing means coupled to both said digital video signal processing means and said digital audio signal processing means for multiplexing digital video and audio signals processed by said digital video signal processing means and said digital audio signal processing means respectively;

parallel-to-serial conversion means coupled to said multiplexing means for converting digital video and audio signals multiplexed by said multiplexing means into respective serial signals; and output terminals for outputting said serial signals converted by said parallel-to-serial conversion means.

4. A digital video/audio processing apparatus for processing a plurality of serial signals, each serial signal reproduced from a digital VTR as a digital video signal multiplexed with an audio digital signal, said apparatus comprising:

a plurality of input terminals, each input terminal receiving a respective serial signal;

a serial-to-parallel converter coupled to said input terminals for converting each serial signal received at each input terminal into a parallel signal;

a demultiplexer coupled to said serial-to-parallel converter for demultiplexing each parallel signal generated by said serial-to-parallel converter;

a digital video signal processor coupled to said demultiplexer for performing special digital processing on digital video signals demultiplexed by said demultiplexer;

a digital audio signal processor, separate from said digital video signal processor, coupled to said demultiplexer for performing special digital processing on digital audio signals demultiplexed by said demultiplexer;

a multiplexer coupled to both said digital video signal processor and said digital audio signal processor for multiplexing digital video and audio signals processed by said digital video signal processor and said digital audio signal processor respectively;

a parallel-to-serial converter coupled to said multiplexer for converting digital video and audio signals multiplexed by said multiplexer into respective serial signals; and output terminals for outputting said serial signals converted by said parallel-to-serial converter.

* * * * *